(12) United States Patent
Schmid et al.

(10) Patent No.: US 7,839,918 B2
(45) Date of Patent: Nov. 23, 2010

(54) METHOD AND DEVICE FOR ESTIMATING A FREQUENCY IN THE ACQUISITION OF A SPREAD-SPECTRUM CODE SIGNAL

(75) Inventors: Andreas Schmid, Duisburg (DE); André Neubauer, Krefeld (DE)

(73) Assignee: Infineon Technologies AG, Munich (DE)

( * ) Notice: Subject to any disclaimer, the term of this patent is extended or adjusted under 35 U.S.C. 154(b) by 1216 days.

(21) Appl. No.: 11/411,170

(22) Filed: Apr. 25, 2006

(65) Prior Publication Data
US 2006/0262835 A1    Nov. 23, 2006

(30) Foreign Application Priority Data
Apr. 25, 2005   (DE) ...................... 10 2005 019 177

(51) Int. Cl.
*H04B 1/00*   (2006.01)
(52) U.S. Cl. .................. 375/148; 375/130; 375/147; 375/149; 375/150; 370/320; 370/335; 370/342
(58) Field of Classification Search ............... 375/148, 375/149, 150, 130; 370/320, 335, 342
See application file for complete search history.

(56) References Cited

U.S. PATENT DOCUMENTS

| 4,527,278 | A | * | 7/1985 | Deconche et al. | ........... | 375/344 |
| 5,805,648 | A | * | 9/1998 | Sutton | ........................ | 375/367 |
| 6,643,678 | B2 | * | 11/2003 | Van Wechel et al. | ........ | 708/530 |
| 6,665,539 | B2 | * | 12/2003 | Sih et al. | ................. | 455/456.3 |
| 2002/0154681 | A1 | * | 10/2002 | Kontola | ....................... | 375/147 |

OTHER PUBLICATIONS

"Synchronization Techniques for Digital Receivers", Umberto Mengali and Aldo N. D'Andrea, New York: Plenum Press 1997, 13 pgs.
"A Coherent Spread-Spectrum Diversity-Receiver with AFC for Multipath Fading Channels", Urs Fawer, IEEE Transactions on Communications, vol. 42, No. 2/3/4, Feb./Mar./Apr., 1994, pp. 1300-1311.
"Signal Synchronization for Direct-Sequence Code-Division Multiple Access Radio Modems (1)", Riccardo De Gaudenzi, Filippo Giannetti and Marco Luise, European Transactions on Telecommunications, vol. 9, No. 1, Jan.-Feb. 1998, pp. 73-90.
"Status of Galileo Frequency and Signal Design", Guenter W. Hein, Jeremie Godet, Jean-Luc Issler, Jean-Christophe Martin, Philippe Erhard, Rafael Lucas-Rodriguez and Tony Pratt, Proc. ION GPS 2002, Sep. 2002, 13 pgs.
Naystar GPS Space Segmet/Navigation User Interferences, ICD-GPS-200C, IRN-200C-005R1, Rev. C, El Segundo, CA: ARINC Research Corporation, Jan. 2003, -198 pgs.

* cited by examiner

*Primary Examiner*—Mohammad H Ghayour
*Assistant Examiner*—Sung Ahn
(74) *Attorney, Agent, or Firm*—Eschweiler & Associates, LLC

(57) ABSTRACT

In a method for estimating a frequency deviation between a received spread-spectrum code signal and a local frequency signal, the received spread-spectrum code signal is despread using a local spread-spectrum code. The despread signal is integrated over a particular integration period. From at least two successively obtained integration values, a phase change value characteristic of the phase change between the two integration values is calculated. From this, the frequency deviation is determined.

9 Claims, 6 Drawing Sheets

Expected value $m_{\overline{\Delta f_\mu}}$ for $\Delta f = 100$Hz

Standard deviation $\sigma_{\overline{\Delta f_\mu}}$ for $\Delta f = 100$Hz

Expected value $m_{\overline{\Delta f}_\mu}$ for $\Delta f = 300Hz$

Standard deviation $\sigma_{\overline{\Delta f}_\mu}$ for $\Delta f = 300Hz$

METHOD AND DEVICE FOR ESTIMATING A FREQUENCY IN THE ACQUISITION OF A SPREAD-SPECTRUM CODE SIGNAL

REFERENCE TO RELATED APPLICATIONS

This application claims the benefit of the priority date of German application DE 10 2005 019 177.0, filed on Apr. 25, 2005, the contents of which are herein incorporated by reference in their entirety.

FIELD OF THE INVENTION

The invention relates to a method and a device for estimating a frequency deviation between a received spread-spectrum code signal and a local frequency signal in the acquisition of the received spread-spectrum code signal in a receiver, such as a receiver of a satellite positioning system.

BACKGROUND OF THE INVENTION

The acquisition of a spread-spectrum code signal, also called CDMA (Code Division Multiple Access) signal, requires finding the frequency deviation (between the received CDMA signal and the local frequency signal used in the receiver for downconversion), the code phase offset (between the received CMDA signal and the local CDMA signal used for despreading the received CDMA signal), and the transmitted CDMA code. Signal acquisition is required in satellite positioning systems such as, for example, Galileo and GPS (Global Positioning System), in satellite-based CDMA communication systems and in terrestrial cellular communication systems such as, for example, UMTS (Universal Mobile Telecommunications System), CMDA-2000, TD-SCDMA (Time Division Synchronous CDMA) and IS-95 (Interim Standard 95).

A CDMA transmitter modulates the CDMA signal to be sent out onto a sinusoidal carrier in the radio-frequency band (RF) and radiates it via an antenna. The CDMA receiver shifts the RF CDMA signal received via an antenna into the baseband. For this so-called downconversion of the received CDMA signal, one or more local reference oscillators are used which are implemented in the receiver. To be able to downconvert the received CDMA signal precisely into the baseband, the CMDA receiver requires knowledge about the frequency of the received CDMA signal and knowledge about the frequency of the local reference oscillator or oscillators used. Due to a number of error sources, neither the received frequency nor the frequency of the local reference oscillator or oscillators is accurately known. The received frequency of the incoming CDMA signal is changed by the Doppler frequency shift which is influenced by a movement of the CDMA transmitter (e.g. satellite) and by a movement of the CDMA receiver. The frequency of the reference oscillator or oscillators is only known within a particular range of tolerance and shifts due to temperature influences, voltage changes, radiation influences, vibrations and other physical effects.

Large Doppler shifts occur particularly in satellite positioning systems due to the satellite movement. It has already been proposed to facilitate acquisition for the receiver by signalling the Doppler shift to be expected. However, the expenditure required for the signalling and too high an inaccuracy of the Doppler frequency shift data transmitted are disadvantageous.

To determine the frequency deviation during signal acquisition, various procedures are known. The possible frequency range is typically subdivided into frequency sub-ranges (so-called frequency bins). The search in the frequency domain is then performed by testing the individual frequency bins. For this purpose, the CDMA receiver downconverts the received signal with the centre frequency of a first frequency bin and uses the down-converted signal as test signal for synchronization. If no synchronization between the CDMA transmitter and the CDMA receiver can be achieved with the test signal, the centre frequency of the next frequency bin is selected and the process is repeated. This method is continued until the correct frequency bin is found with which synchronization is successful. The centre frequency of this correct frequency bin is the result of the frequency search in this known acquisition method.

The disadvantageous factor in this method is that the residual error of the method is only determined by the width of the frequency bin. Furthermore, the sensitivity of the method is influenced by the width of the frequency bin. To achieve a low residual error and high sensitivity, the frequency width of the frequency bin must be typically selected to be small. This results in a relatively long acquisition period, the period needed for the acquisition process increasing linearly with the residual-error accuracy needed.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more de-tailed description that is presented later.

The invention is directed to a method of rapid and accurate estimation of the frequency deviation between a received CDMA signal and a local reference oscillator in an acquisition process in a CDMA receiver. The invention is also directed to a device for estimating such a frequency deviation having such characteristics.

In the method according to one embodiment of the invention, a frequency-shifted spread-spectrum code signal (CDMA signal) is generated from the received signal by downconverting the received spread-spectrum code signal by the local frequency signal. In this process, both single-stage (direct downconversion) and multi-stage frequency conversion methods (heterodyne methods) can be used in which the received RF signal is first converted into an intermediate-frequency range (IF signal) and is then transferred into the baseband. The downconverted (i.e., frequency-shifted) spread-spectrum code signal is then despread by means of a local spread-spectrum code. The despread spread-spectrum code signal is repeatedly integrated over an integration period, a complex integration value being formed with each integration process. At least two (e.g., adjacent) complex integration values of this sequence are evaluated for determining the frequency deviation.

The method according to another embodiment of the invention has the advantage that very short measuring times are needed for determining the frequency deviation. A first estimated value for the frequency deviation is already available after a minimum period of two integration values. This estimated value already has a high accuracy. For GPS or Galileo signals of a positioning system, the standard deviation during the determination of the frequency deviation for a signal attenuated by 20 decibels is about 5% with an observation time of 100 milliseconds. A further advantage of the method according to one embodiment of the invention is that the residual error interval (i.e., the accuracy of the measurement) is not predetermined (by the determination of the width of the individual frequency bins as in the prior art), but can be influenced by the observation period within the measurement.

The method according to another embodiment of the invention is used for the signal acquisition of a receiver of a satellite positioning system. In satellite positioning systems, a comparatively high Doppler frequency shift occurs due to the satellite movement. In addition, many such receivers operate in single-shot measurement mode in which the receiver is switched off again after each individual measurement for energy saving reasons. Since each new position measurement requires a reacquisition of the satellite signals, the performance of such a system is significantly determined by its acquisition characteristics. It is especially in such systems that the advantages of the present invention—short acquisition time, high accuracy in the determination of the frequency deviation, high sensitivity (e.g., the acquisition can still be performed successfully with a low signal/noise ratio)—are particularly clearly apparent.

The evaluation of the integration values, in one example, is performed in such a manner that a phase change value characteristic of a phase change between the two complex integration values is calculated. The frequency deviation between the received spread-spectrum code signal and the local frequency signal is then calculated based on at least one phase change value determined in this manner.

For calculating the phase change value, the one integration value, in one example, is multiplied by the complex conjugate of the other integration value. Since during the multiplication of a first complex value by the complex conjugate of a second complex value, a complex product is formed, the phase angle of which is the difference of the phase angles of the two complex values in complex number representation, the phase change value characteristic of the phase change between the two complex integration values can be calculated simply by a multiplication.

To calculate the frequency deviation from the phase change value, the argument function for an argument dependent on the phase change value is used, in one example. Using the argument function for the complex phase change value offers a simple possibility for fully exploiting the value range of the phase angle of the phase change value of $2\pi$. As an alternative, the arc tan function can also be directly used which reduces the value range to $\pi$. In one advantageous embodiment of the method according to the invention the integration period is the spread-spectrum code period or a multiple of the spread-spectrum code period. By extending the integration period to a multiple of the spread-spectrum code period, a high accuracy of the determination of the frequency deviation is also achieved under distinctly poor signal power/noise power ratios. However, increasing the integration period may reduce the capture range of the frequency acquisition.

In another embodiment of the method according to the invention, an associated single-frequency deviation is calculated for each phase change value and the frequency deviation is determined by averaging the single-frequency deviations. If an observation period of one second is evaluated for the averaging (i.e., 1000 frequency deviations are determined), an error of only about 1% is obtained for the determination of the frequency deviation for a signal attenuated by 20 decibels in a Galileo or GPS positioning system.

The method according to one embodiment of the invention for determining the frequency deviation can be performed in time after the determination of the received time of the spread-spectrum code sequence (so-called code phase synchronization). However, in one advantageous embodiment of the invention the code phase synchronization is performed during the determination of the frequency deviation. In this example, the frequency synchronization according to the invention and the code phase synchronization are performed concurrently, thereby accelerating the acquisition process.

According to another embodiment of the invention, a device for estimating a frequency deviation comprises a component configured to downconvert the received spread-spectrum code signal by the local frequency signal, and a component configured to despread the frequency-shifted spread-spectrum code signal with a local spread-spectrum code. The invention further comprises an integrator configured to repeatedly and coherently integrate the despread spread-spectrum code signal over an integration period. An evaluation component is also included and is configured to evaluate at least two complex integration values, obtained during the integration, for calculating the frequency deviation. In this arrangement, the evaluation component, for example, comprises a first calculation device that calculates the phase change value from at least two complex integration values, and a second calculation device that calculates the frequency deviation based on at least one phase change value.

In one advantageous illustrative embodiment, the first and second calculation devices comprise dedicated hardware circuits. This provides for fast, low-expenditure processing of the data processed by these circuits.

In another embodiment, the integrator is configured to integrate the despread spread-spectrum code signal over an adjustable integration period. Due to the adjustability of the integration period, the sensitivity can be adjusted, particularly increased, as required.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the text which follows, the invention will be explained in greater detail by means of one or more illustrative embodiments, referring to the drawings, in which.

DETAILED DESCRIPTION OF THE INVENTION

Figure 1:
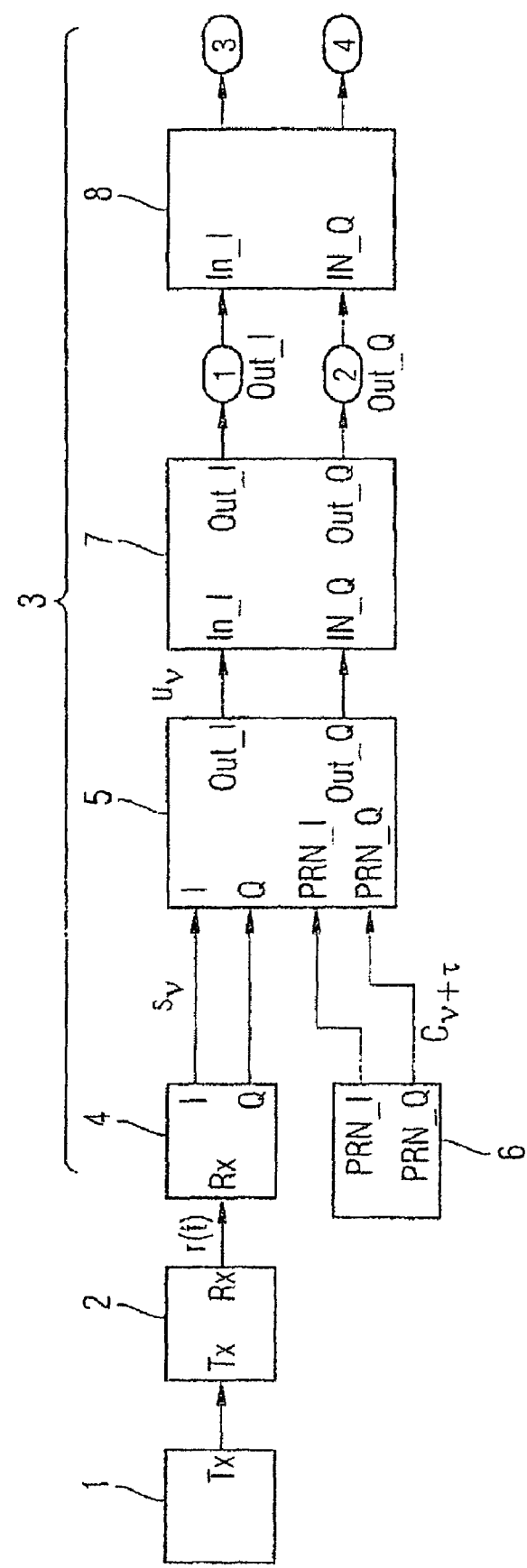
FIG. 1 shows a diagrammatic representation of function blocks for explaining the signal generation, the signal transmission and the signal processing in the CDMA receiver according to one embodiment of the invention.

FIG. 1 shows the general structure of the transmission system considered. It has a CDMA transmitter 1 which feeds a CDMA signal into a transmission channel 2. The output of the transmission channel 2 represents the received signal for the CDMA receiver. The CDMA receiver comprises a circuit for determining the frequency deviation 3. The circuit for determining the frequency deviation comprises a mixing and sampling stage 4 which receives the received signal, downconverts it to an intermediate frequency or directly into the baseband and carries out sampling at a suitable place on the signal path. The mixing and sampling stage 4 is followed by a despreading stage 5 which receives and despreads the digital, frequency-shifted signal output by the mixing and sampling stage 4. For this purpose, the despreading stage 5 is fed with the same spread-spectrum code which was used during the signal generation in the CDMA transmitter 1. This spread-spectrum code is generated in a local spread-spectrum code generator 6. In accordance with conventional notation, the in-phase and quadrature signal components in FIG. 1 are designated by I (in-phase) and Q (quadrature). The spread-spectrum code output by the spread-spectrum code generator 6 (i.e., the CDMA code) is also called PRN (Pseudo Random Noise) code. In this document, the terms spread-spectrum code, CDMA code and PRN code are used synonymously.

The despreading stage 5 outputs a despread signal (more precisely its I and Q components) and supplies this signal to an integration unit 7. The integration unit 7 is followed by a circuit 8 for calculating a correlation result and the frequency deviation.

In the text which follows, the structure and the operation of the transmission system shown in FIG. 1 will be explained in greater detail with reference to FIGS. 2 to 8. The illustrative embodiment described in the text which follows relates to a satellite positioning system, for example Galileo or GPS, by way of example. However, it can be applied in a simple manner to other CDMA transmission systems in which frequency synchronization has to be performed. In particular, it can be used in the known CDMA systems specified in the introduction, and all such systems and applications are contemplated as falling within the scope of the present invention.

Figure 3:
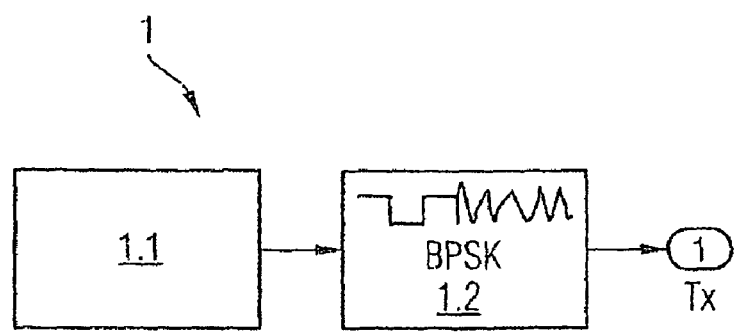
FIG. 3 shows a block diagram of the CDMA transmitter shown in FIG. 1 according to one embodiment of the invention.
Figure 4:
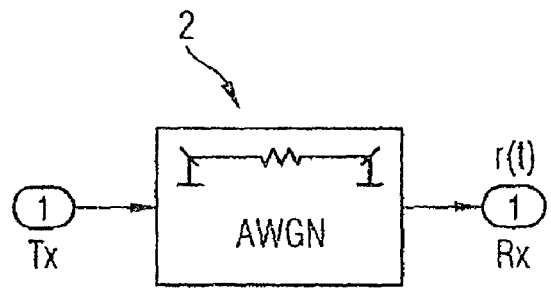
FIG. 4 shows a block diagram of the transmission channel shown in FIG. 1 according to one embodiment of the invention.
Figure 5:
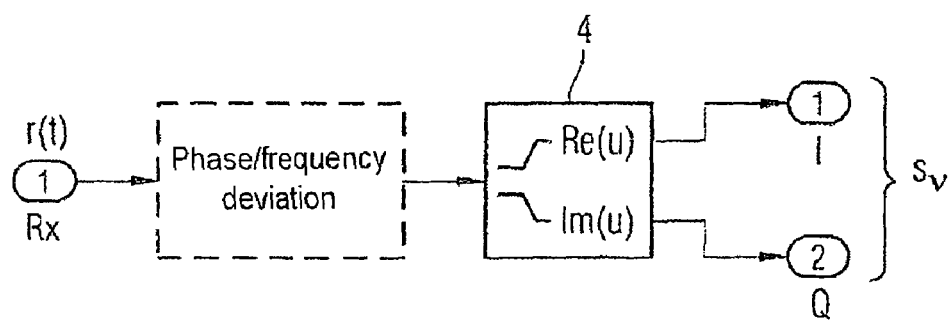
FIG. 5 shows a block diagram of the mixing stage shown in FIG. 1 according to one embodiment of the invention.

According to FIG. 3, the satellite-based CDMA transmitter 1 comprises a code generator 1.1 which generates a GOLD code in periodic repetition. The GOLD code, in one example, consists of 1023 chips and represents the spread-spectrum code. The GOLD code present in the baseband is modulated onto a RF carrier, e.g., by means of a BPSK (Binary Phase Shift Keying) modulator 1.2. A complex AWGN (Additive White Gaussian Noise) channel 2 is used as a basis for the transmission channel, see FIG. 4. The analogue output signal of the AWGN transmission channel 2 is the received signal r(t). FIG. 5 shows by the dashed box that the received signal r(t) has a phase angle which is unknown in the receiver, and a frequency deviation (compared with the local frequency used in the receiver).

In a special implementation of the mixing and sampling stage 4, the received signal r(t) is converted into an intermediate frequency (IF) by means of a first local oscillator frequency $f_{LO1}$ according to the following equation:

$$r_{IF}(t) = r(t) \cdot \exp(-j \cdot 2\pi \cdot f_{LO1} \cdot t). \quad (1)$$

where t is the time, j is the imaginary unit and $r_{IF}(t)$ is the received signal converted into intermediate frequency. This signal $r_{IF}(t)$ is then sampled at sampling times $v \cdot T_S$ where $T_S$ is the sampling period and v is the sampling index. The digital intermediate-frequency signal is then converted into baseband by means of a second local oscillator frequency $f_{LO2}$. The digital baseband signal $s_v$ is $$s_v = r_{IF,v} \cdot \exp(-j \cdot 2\pi \cdot f_{LO2} \cdot v \cdot T_s) = r_\sigma \cdot \exp[-j \cdot 2\pi \cdot (f_{LO1} + f_{LO2}) \cdot v \cdot T_s]. \quad (2)$$

where $r_{IF}$ v is the digital intermediate-frequency signal present after the sampling.

It is pointed out that the downconversion and the sampling of the received signal r(t) can be performed in many other ways. In particular, the sampling can also take place before or after the downconversion and apart from a multi-stage downconversion, a direct downconversion into the baseband is also possible, and such variations are contemplated as falling within the scope of the invention.

As already explained initially, the correct value of $f_{LO1} + f_{LO2}$ is initially unknown. It must be determined by the determination of the frequency deviation $\Delta f_\mu$, described in the text which follows.

Figure 7:
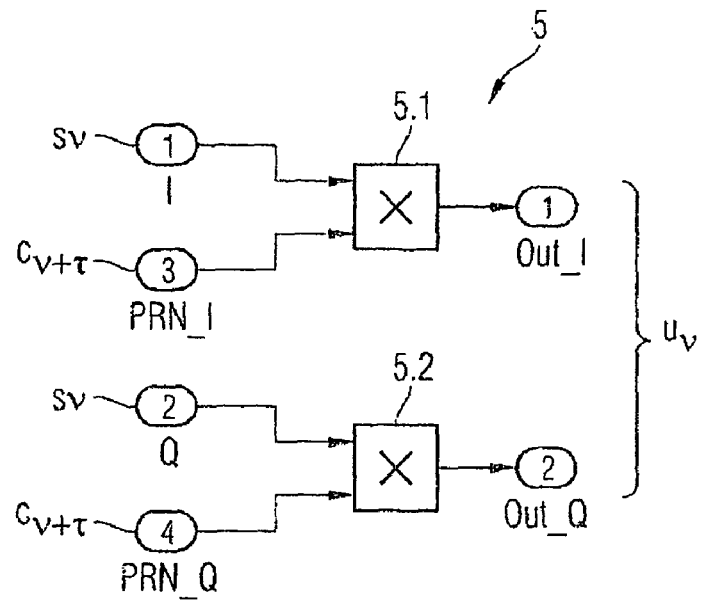
FIG. 7 shows a block diagram of the despreading stage shown in FIG. 1 according to one embodiment of the invention.

In a simple example embodiment, the despreading stage 5 can have two multipliers 5.1, 5.2, see FIG. 7. For 1-bit signals, the multipliers can also be replaced by Exclusive-Or gates. The same applies to input signals coded in amount and sign. The one multiplier 5.1 is supplied with the I signal components of the digital baseband signal $s_v$ and the local PRN reference code $c_{v+\tau}$ generated in the spread-spectrum code generator 6 whereas the second multiplier 5.2 receives the Q signal components of these signals. To facilitate understanding, it is initially assumed that the code phase synchronization has already been performed, i.e. that the timing of the PRN code in the received signal r(t) is already known so that the PRN reference code is multiplied onto the baseband signal $s_v$ at the correct time in the despreading stage 5. τ here designates the (known) timing, found during the code phase synchronization, of the PRN reference code $c_{v+\tau}$.

Figure 6:
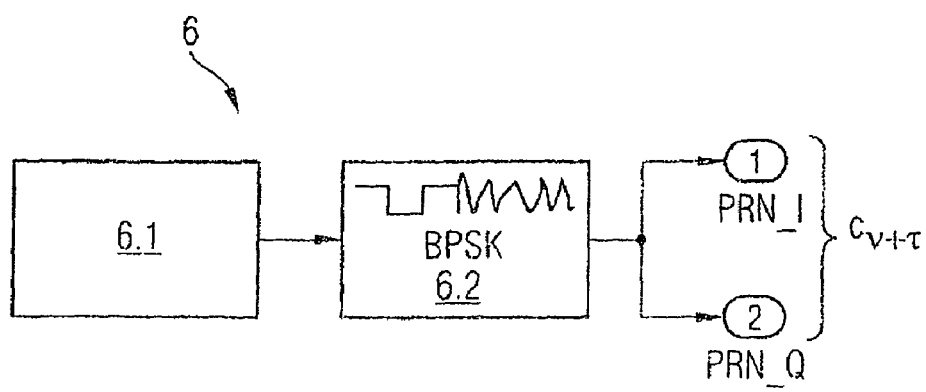
FIG. 6 shows a block diagram of the code generator shown in FIG. 1 according to one embodiment of the invention.

According to FIG. 6, the local spread-spectrum code generator 6 comprises a GOLD code generator 6.1 and a BPSK modulator 6.2. In this regard, its structure corresponds to the structure of the CDMA transmitter 1. The local spread-spectrum code generator 6 provides the PRN reference code $c_{v+\tau}$ as I and Q signal components.

The despread signal $\mu_v$ at the output of the despreading stage 5 is $$\mu_\sigma = s_\sigma \cdot c_{\sigma+\tau} = r_\sigma \cdot \exp[-j \cdot 2\pi \cdot (f_{LO1} + f_{LO2}) \cdot v \cdot T_s] \cdot c_{\sigma+\tau}. \quad (3)$$

Figure 8:
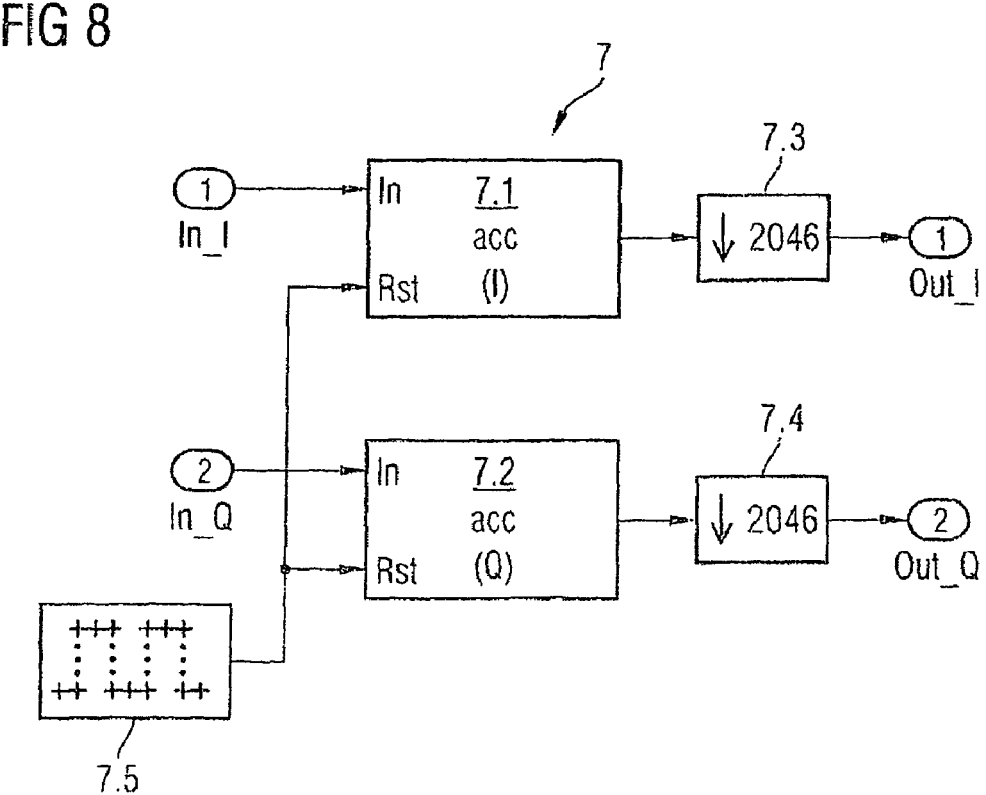
FIG. 8 shows a block diagram of the integration unit shown in FIG. 1 according to one embodiment of the invention.

The despread signal $u_\sigma$ is coherently integrated over L successive samples in the integration unit 7 (see FIG. 8). For this purpose, the integration unit 7 comprises two accumulators 7.1 and 7.2 which form a running sum of the I samples and of the Q samples of the despread signal $u_v$. Accumulation takes place at the sampling rate. Assuming, for example, a 2-fold oversampling of the GOLD code (i.e. $T_s$ is a half chip period), L=2046 samples are accumulated in one spread-spectrum code period. The accumulators 7.1 and 7.2 are reset after each spread-spectrum code period at L=2046 by a pulse generator 7.5. To output the accumulation result (i.e. the complex integration values), each accumulator 7.1 and 7.2 is followed by a decimator 7.3 and 7.4, respectively (a decimation factor of 2046 is used in a present example). In the general case, the quantity L (number of accumulated successive samples) can be adjusted in the integration unit 7 so that coherent integration is possible over a required number of spread-spectrum code periods.

The coherent integration unit 7 calculates a sequence of integration values $v_\mu$ according to the following equation $$v_\mu = \sum_{\nu=1}^{L} u_{\nu+\mu \cdot L} \quad (4)$$

$$= \sum_{\nu=1}^{L} r_{\nu+\mu \cdot L} \cdot$$

$$\exp[-j \cdot 2\pi \cdot (f_{L01} + f_{L02}) \cdot (\nu + \mu \cdot L) \cdot T_s] \cdot c_{\nu+\mu \cdot L+\tau}.$$

The integration values $v_\mu$ still have a signal/noise ratio which is typically too low for code synchronization, i.e. the complex integration values would, in such an example, be incoherently accumulated during a code synchronization.

To estimate the frequency deviation $\Delta f_\mu$, an integration value $v_\mu$ is multiplied by the conjugate complex of the preceding integration value $v^*_{\mu-1}$. The following equation is obtained.

$$\Psi_\mu = v_\mu \cdot v^*_{\mu-1} \quad (5)$$

$$= \begin{pmatrix} \sum_{\nu=1}^{L} r_{\nu+\mu \cdot L} \cdot \\ \exp[-j \cdot 2\pi \cdot (f_{L01} + f_{L02}) \cdot (\nu + \mu \cdot L) \cdot T_s] \cdot \\ c_{\nu+\mu \cdot L+\tau} \end{pmatrix} \cdot$$

$$\begin{pmatrix} \sum_{\nu=1}^{L} r_{\nu+(\mu-1) L} \cdot \\ \exp[-j \cdot 2\pi \cdot (f_{L01} + f_{L02}) \cdot (\nu + (\mu-1) \cdot L) \cdot T_s] \\ c_{\nu+(\mu-1)L+\tau} \end{pmatrix}^*$$

The frequency deviations $\Delta f_\mu$ can be obtained from the sequence of complex product values $\Psi_\mu$ by applying the argument function to the product values $\Psi_\mu$ and scaling in accordance with the following equation $$\Delta f_\mu = \frac{1}{2\pi \cdot L \cdot T_s} \arg\{\Psi_\mu\} \quad (6)$$

$$= \frac{1}{2\pi \cdot L \cdot T_s} \begin{bmatrix} \arctan\left(\frac{\mathrm{Im}\{\Psi_\mu\}}{\mathrm{Re}\{\Psi_\mu\}}\right) + \frac{\pi}{2} \cdot \\ \mathrm{sign}(\mathrm{Im}\{\Psi_\mu\}) \cdot (1 - \mathrm{sign}(\mathrm{Im}\{\Psi_\mu\})) \end{bmatrix}$$

$$= \arg\Bigg\{ \sum_{\nu=1}^{L} r_{\nu+\mu \cdot L} \cdot \exp\begin{bmatrix} -j \cdot 2\pi \cdot (f_{L01} + f_{L02}) \cdot \\ (\nu + \mu \cdot L) \cdot T_s \end{bmatrix} \cdot c_{\nu+\mu \cdot L+\tau} \cdot$$

$$\left( \sum_{\nu=1}^{L} r_{\nu+(\mu-1) \cdot L} \cdot \exp\begin{bmatrix} -j \cdot 2\pi (f_{L01} + f_{L02}) \cdot \\ (\nu + (\mu-1) \cdot L) \cdot T_s \end{bmatrix} \cdot c_{\nu+(\mu-1)L+\tau} \right)^* \Bigg\}$$

-continued $$\frac{1}{2\pi \cdot L \cdot T_s}$$

The argument function can be replaced by a combination of arc tan and signum functions according to equation 6. The signum function is also called sign function. It becomes clear that only two complex integration values $v_\mu$, $v^*_{\mu-1}$ are needed for calculating a frequency deviation $\Delta f_\mu$ and that for each integration period, a value $\Delta f_\mu$ of the frequency deviation is obtained.

Figure 2:
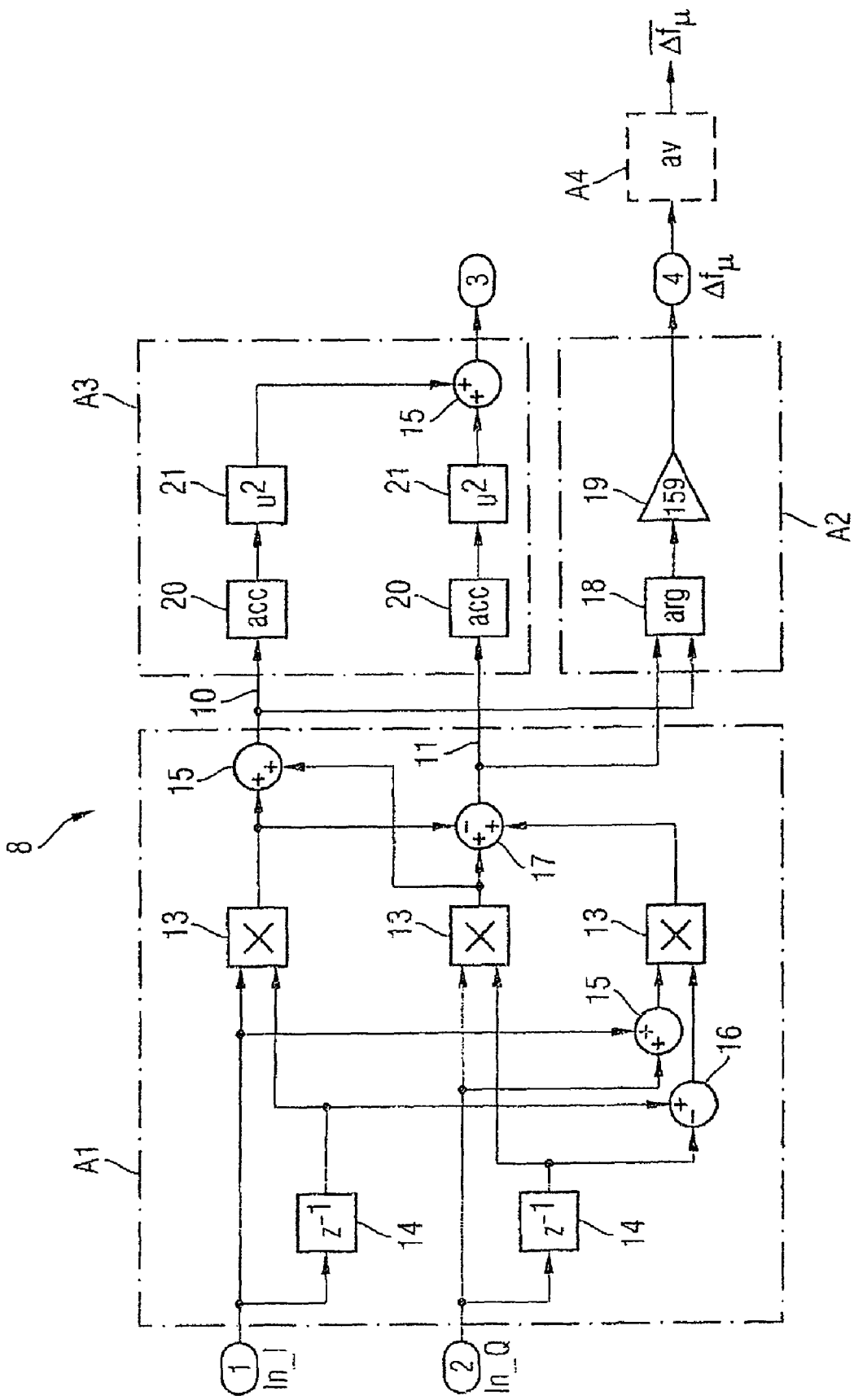
FIG. 2 shows an illustrative circuit for calculating the frequency deviation and a correlation result according to one embodiment of the invention.

FIG. 2 shows a possible implementation of the circuit 8 for calculating a correlation result and the frequency deviation $\Delta f_\mu$. From the circuit configuration it can be easily seen that the circuit section A1 determines a calculation of the real part of the product $v_\mu \cdot v^*_{\mu-1}$ (present at signal line 10) and of the imaginary part of the product $v_\mu \cdot v^*_{\mu-1}$ (present at signal line 11). Reference symbol 13 here designates real multipliers, reference symbol 14 designates delay elements, reference symbol 15 designates adders, reference symbol 16 designates a subtractor and reference symbol 17 designates a combined adder and subtractor. The required signal delay for forming the product $v_\mu \cdot v^*_{\mu-1}$ is produced by the delay elements 14.

Circuit section A2 receives the real part and the imaginary part of the complex product $v_\mu \cdot v^*_{\mu-1}$ and forms the quotient and determines the argument function in unit 18. The function value is scaled by means of the scaler 19. At the output of the scaler 19, the sequence of frequency deviations $\Delta f_\mu$ is output.

An optional circuit section A4 forms a running average of the individual frequency deviations $\Delta f_\mu$ and outputs a sequence of averaged frequency deviations $\overline{\Delta f_\mu}$ at its output. For example, a running average can be formed over N individual frequency deviations $\Delta f_\mu$, where N can be a quantity which can be adjusted in the circuit 8.

To compensate for the frequency deviation, for example, the local oscillator frequency $f_{LO2}$ is then selected in such a manner that it compensates for the frequency deviation $\Delta f_\mu$ or the averaged frequency deviation $\overline{\Delta f_\mu}$.

The circuit 8 can also comprise a circuit section A3 which has two accumulators 20, two squarers 21 and one adder 15. The circuit section A3 also receives the signals 10 and 11 and forms the square of the absolute value of the accumulated product values $v_\mu \cdot v^*_{\mu-1}$.

The correlation result provided at the output of the circuit section A3 can be used for the code phase synchronization, i.e. for determining $\tau$. In this case, the determination of the frequency deviation (frequency synchronization) and the determination of the code timing (code phase synchronization) are performed concurrently in the received signal r(t). A possible implementation consists in that the signal path defined by the circuits 6, 5, 7, 8 is multiplied in a parallel arrangement. Each of these signal paths is then operated at a different timing $\tau$ of the local PRN code. The correlation outputs of the circuit sections A3 are monitored. If a high correlation result occurs at one of the correlation outputs, this indicates that phase synchronism is present in this signal path and thus the despreading stage 5 of this signal path is performing correct despreading. The frequency deviations $\Delta f_\mu$ and $\overline{\Delta f_\mu}$, respectively, supplied by this code-phase-synchronized signal path are then used for the frequency synchronization.

It is pointed out that the signal path 6, 5, 7, 8 can be completely implemented in the form of a dedicated hardware circuit. In particular, this applies to circuit 8 for calculating the correlation result and the frequency deviation. For example, the unit 18 can be constructed in the form of a function-value lookup table stored in a memory.

Figure 9A:
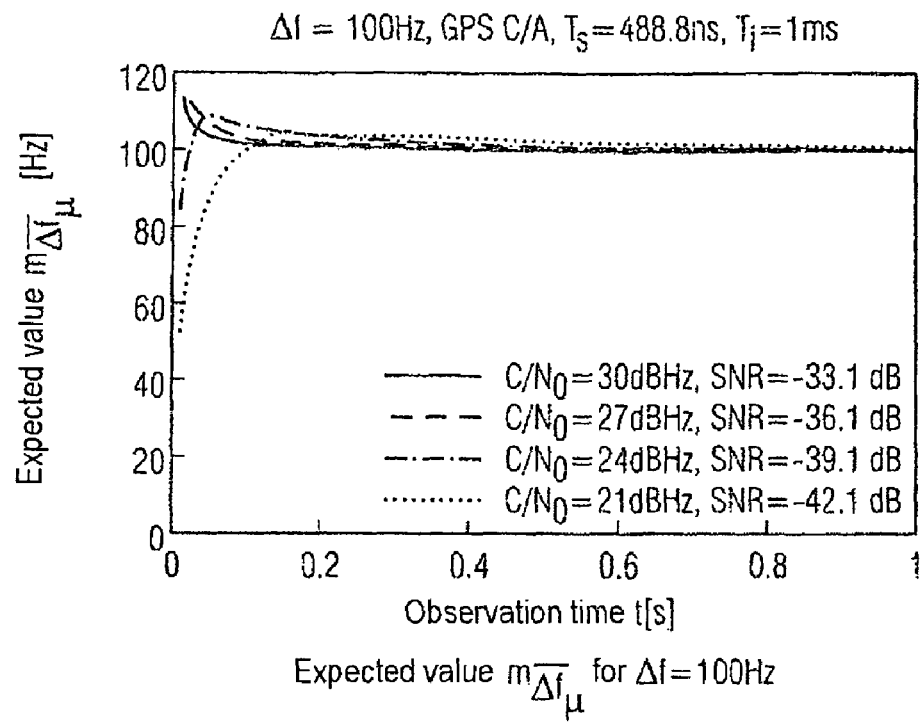
FIGS. 9A-D shows illustrations in which, with an integration period of 1 ms, the expected value and the standard deviation of the frequency deviation are shown over the averaging time with different ratios of carrier power to spectral interference power density according to one or more embodiments of the invention.
Figure 9B:
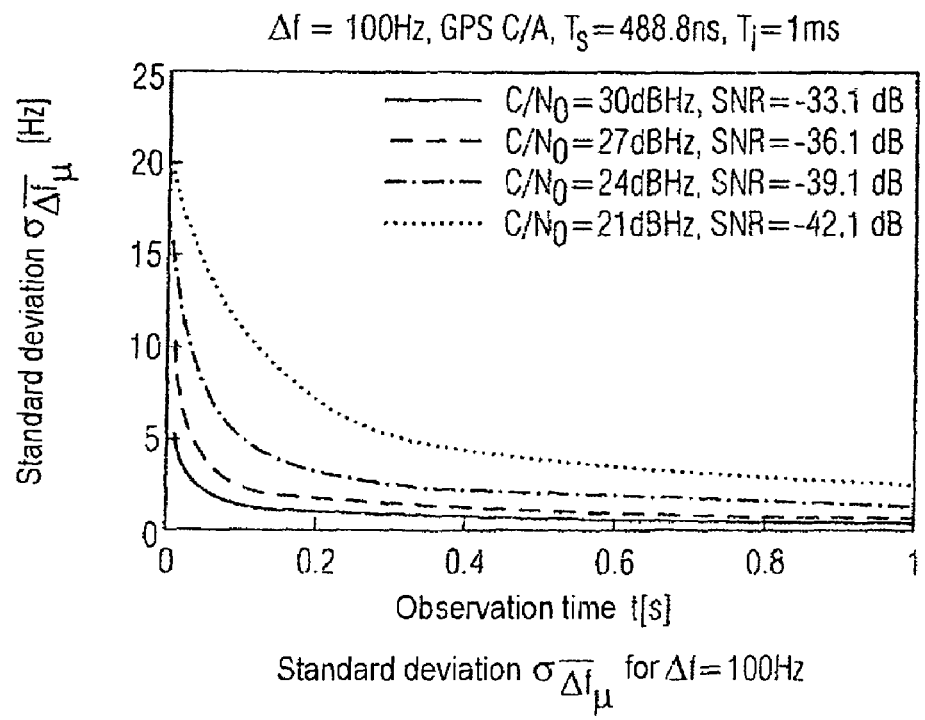
Figure 9C:
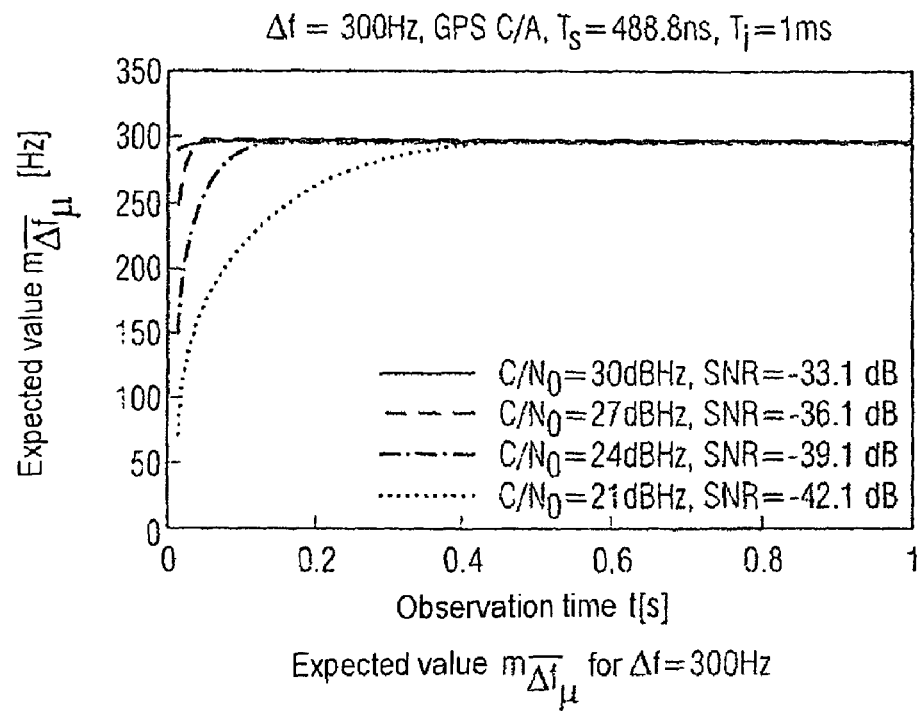
Figure 9D:
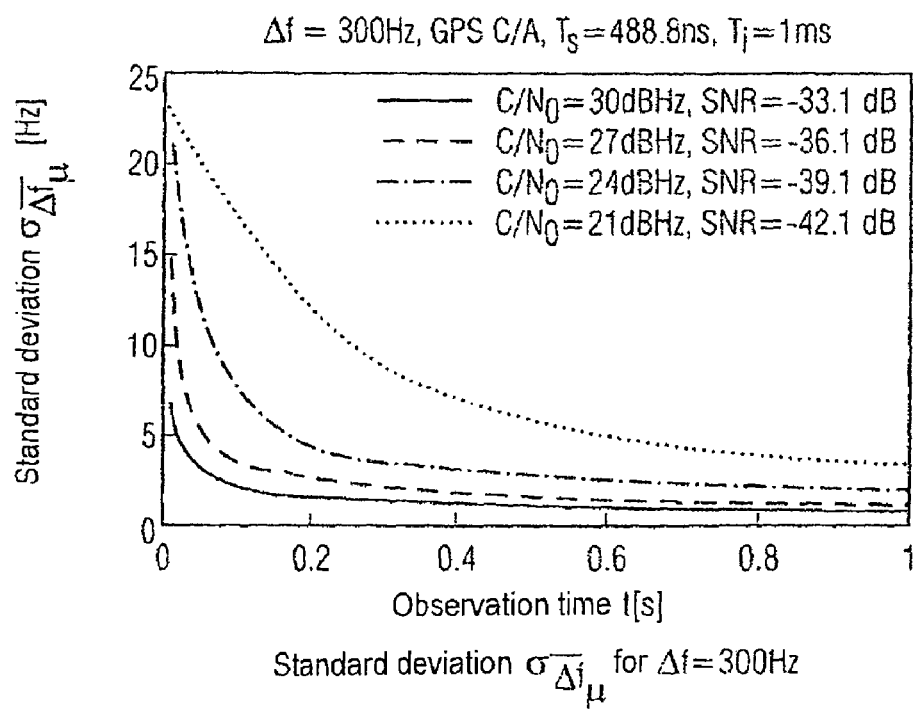

FIGS. 9A-9D show simulation results of the circuit shown in FIG. 2. The simulation was based on the example, already considered, of a CDMA code of a code length of 1023 chips, a code rate of 1.023 Mchips/s (and in consequence a code period of 1 ms), a sampling rate $T_s^{-1}$ of 2.046 MHz, a coherent integration period of 1 ms and (due to the two-fold oversampling) an integration number L=2046. In illustrations 9A-9D, the expected value and the standard deviation of the averaged frequency deviation $\overline{\Delta f_\mu}$ are shown with respect to the observation time t. The simulation results were determined for various values $C/N_0$, where C is the carrier power and $N_0$ is the spectral interference power density. The signal power/noise power ratio S/N is obtained from the ratio $C/N_0$ according to $S/N=C/(n_0 \cdot 2.046 \text{ MHz})$. Furthermore, the $C/N_0$ ratios can be converted into attenuation factors D for the transmission of the line-of-sight signal. For GPS signals, the result is $D_{GPS}=(35.30 \cdot 10^3 \text{ Hz} \cdot N_0)/C$ and for Galileo signals, the corresponding relation is $D_{Galileo}=(39.60 \cdot 10^3 \text{ Hz} \cdot N_0)/C$. The actual frequency shifts used as a basis for the simulation are 100 Hz (FIGS. 9A, 9B) and 300 Hz (FIGS. 9C, 9D). It becomes clear that an accurate estimation of the frequency deviation $\overline{\Delta f_\mu}$ is already possible after a short time in spite of the short integration period.

It is pointed out that both the accuracy and the sensitivity of the determination of the frequency deviation is dependent on the observation period. The observation period is influenced both by the integration period L in the integration unit 7 and by the length N over which the running average of the individual-frequency deviations $\Delta f_\mu$ is formed in the circuit section A4. Increasing the integration period L has a greater effect on the accuracy and the sensitivity of the measurement then a corresponding increase in time of the length for forming the average N. However, increasing L reduces the capture range (i.e. the maximum range within which the frequency deviation can be estimated). This does not apply to an increase in the length for forming the average N which has no influence on the capture range.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for estimating a frequency deviation between a received spread-spectrum code signal and a local frequency signal in the acquisition of the received spread-spectrum code signal in a CDMA receiver, comprising:
   generating a frequency-shifted spread-spectrum code signal from the received spread-spectrum code signal by downconverting the received spread-spectrum code signal by the local frequency signal;
   despreading the frequency-shifted spread-spectrum code signal using a local spread-spectrum code;
   repeated coherent integrating of the despread frequency-shifted spread-spectrum code signal over an integration period, thereby forming a sequence of complex integration values; and
   evaluating at least two of the sequence of complex integration values by calculating a phase change value characteristic of a phase change between the at least two of the sequence of complex integration values to determine the frequency deviation by calculating the frequency deviation based on the phase change value characteristic,
   wherein calculating the phase change value characteristic comprises multiplying one complex integration value by the complex conjugate of the other complex integration value.

2. The method of claim 1, wherein the signal acquisition method is used in the CDMA receiver of a satellite positioning system.

3. The method of claim 1, wherein calculating the frequency deviation from the phase change value characteristic comprises applying an argument function to a complex-valued argument dependent on the phase change value characteristic.

4. The method of claim 1, wherein calculating the frequency deviation from the phase change value characteristic comprises applying an arc tan function to a complex-valued argument dependent on the phase change value characteristic and a signum function to an argument dependent on the phase change value characteristic.

5. The method of claim 1, wherein calculating the phase change value characteristic comprises calculating the frequency deviation by averaging over a number of single-frequency deviation calculations, wherein each single-frequency deviation is determined from a phase change value characteristic.

6. The method of claim 1, further comprising that during calculation of the frequency deviation, determining a received timing of the spread-spectrum code in the received spread-spectrum code signal.

7. The method of claim 1, wherein the integration period comprises the spread-spectrum code period or a multiple of the spread-spectrum code period.

8. The method of claim 1, further comprising performing signal sampling before despreading the frequency-shifted spread-spectrum code signal, thereby forming a frequency-shifted spread-spectrum code digital signal.

9. The method of claim 1, wherein the phase change value is characteristic of a phase change between two of the sequence of complex integration values and is calculated on the basis of these two of the sequence of complex integration values.

\* \* \* \* \*